UNITED STATES PATENT OFFICE.

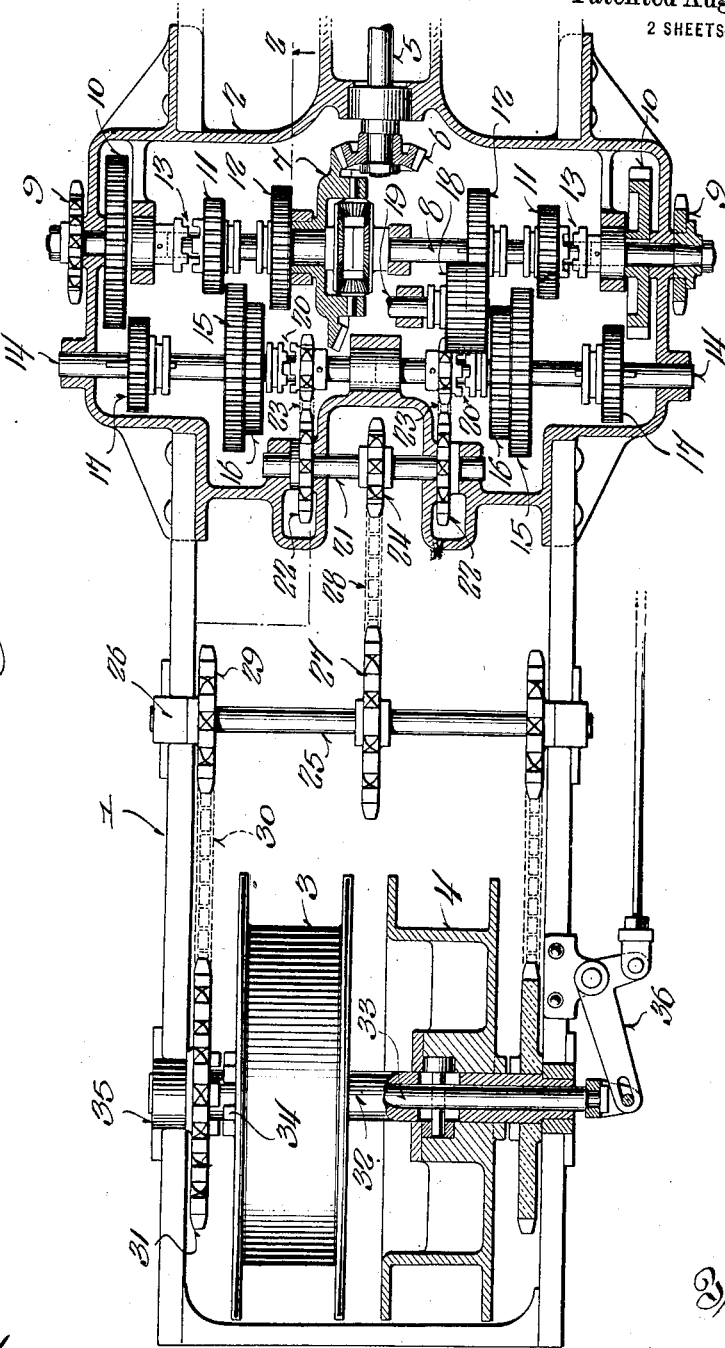

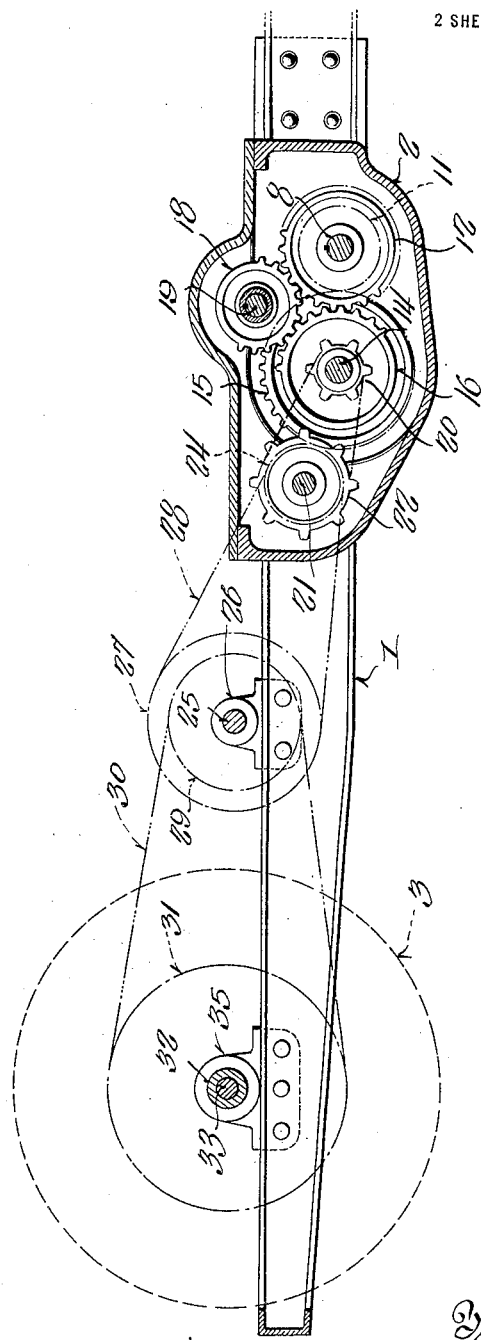

FLOYD CORNELISON, OF MILWAUKEE, WISCONSIN.

TRANSMISSION.

1,386,396.     Specification of Letters Patent.     Patented Aug. 2, 1921.

Application filed August 30, 1920. Serial No. 406,915.

*To all whom it may concern:*

Be it known that I, FLOYD CORNELISON, a citizen of the United States, and resident of Milwaukee, in the county of Milwaukee and State of Wisconsin, have invented certain new and useful Improvements in Transmissions; and I do hereby declare that the following is a full, clear, and exact description thereof.

My invention relates to new and useful improvements in transmissions, particularly those adapted for application to tractors, traction engines and trucks.

A main object of the invention is to provide a simply constructed and readily operated transmission mechanism whereby either the vehicle drive means or a windlass mechanism may be independently operated from a common power unit at the will of the driver or operator of the vehicle.

An additional object of the invention is to provide a transmission mechanism of this character whereby both the vehicle drive means and the windlass drive means may be selectively operated at different speeds.

A specific object of the invention is to provide a transmission mechanism including a jack shaft which is selectively connectible with either the vehicle drive means or the windlass operating means.

A still further object of the invention is to provide a simply arranged and compact transmission mechanism which can be easily associated with both a vehicle drive means and a windlass operating means.

With these and other objects in view which will become apparent as the description proceeds, the invention consists in the novel features of construction, combination and arrangement of parts which will be hereinafter more particularly described and claimed.

In the accompanying drawings,

Figure 1 represents a substantially horizontal sectional view through a transmission mechanism constructed in accordance with the invention and connected with parts to be operated therethrough, and Fig. 2 is a vertical longitudinal sectional view taken substantially on the plane of the line 2—2 of Fig. 1.

Referring more particularly to the drawings, the reference character 1 denotes a vehicle frame of any suitable or desired length and shape having a transmission casing 2 supported thereby as well as a pair of windlass drums 3 and 4. The power unit (not shown) is ordinarily located forwardly of the transmission casing 2 and has a drive or crank shaft 5 extended therefrom and journaled in the front wall of said casing. That portion of the shaft 5 which extends into the casing 2 is provided with a bevel gear 6.

The transmission casing 2 also forms a housing for a differential 7 with one portion of which the gear 6 is meshed. Two-part differential shafts 8 extend in opposite directions from the differential 7 and are journaled in the ends of the casing 2 and in suitable bearings carried thereby. The axis of the differential shafts 8 is transverse of the frame 1, and the ends of the outer shaft sections which extend through the end walls of the casing 2 are provided with sprockets 9 or other means for connecting the differential shafts with the vehicle drive means.

Each outer section of each differential shaft 8 is also provided with a driven gear 10 whereas each inner section has a pair of selective speed gears 11 and 12 slidably splined thereon. Furthermore the two sections of each differential shaft may be connected together so as to rotate in unison by a clutch 13, whereby there may be a direct drive from the shaft 5 through the differential 7 to the outer ends of the differential shafts.

Disposed substantially parallel with the axis of the differential shafts 8 is a two-part jack shaft 14 having its opposite ends journaled in the end walls of the casing 2 and its intermediate portion in a bearing carried by the rear wall of the latter. Each of the sections of the jack shaft 14 carries a pair of gears 15 and 16 of different sizes which are adapted to be meshed with the gears 11 and 12 respectively. Each of the gears 10 also has a coöperating drive gear 17, said gears being slidably splined on the parts of the jack shaft 14.

The corresponding gears of the different pairs and the clutches 13 are adapted to be simultaneously shifted by means of levers or the like under the control of the operator, these parts not being illustrated in view of the fact that they form no part of the present invention. However, it will be seen that if the gears 12 are slid on the differential shafts until they are meshed with the gears 16, and the gears 17 meshed with the gears 10, the sprockets 9 will be rotated at an intermediate speed to drive the vehicle. If the gears 11 are engaged with the gears 15 and the gears 17 with the gears 10, the vehicle may be driven at a low speed, while a higher speed of the same is obtained by connecting the parts of the clutches 13. Movement of the vehicle in a reverse direction is possible through the use of sliding gears 18 on a counter-shaft 19, these gears 18 being adapted to be meshed with the gears 12 and 16.

Each section of the jack shaft 14 also carries a clutch 20, the movable parts of which are capable of being shifted at the will of the operator when the power unit is to be employed for operating the windlass drums 3 and 4. Parts of each of the clutches 20 carry sprocket teeth or the like whereby a driving connection may be obtained between each section of the jack shaft and a short shaft 21 through sprockets 22 thereon and sprocket chains 23. As shown more clearly in Fig. 1 this short shaft 21 is journaled in suitable bearings carried by the transmission casing 2, but has the intermediate portion exposed and provided with a sprocket 24, whereby it may be connected with an intermediate shaft 25.

This shaft 25, like the shaft 21, extends transversely of the frame 1 and has its opposite ends journaled in bearings 26 mounted thereon. The sprocket 24 on the shaft 21 and a similar sprocket 27 on the shaft 25 has a sprocket chain 28 disposed therearound, and sprockets 29 on each end portion of the shaft 25 are provided with sprocket chains 30 which are trained around sprockets 31 on the shaft 32 of the windlass drums 3 and 4.

The drum shaft 32 is preferably hollow and receives a shifter rod 33 whereby the drums 3 and 4 may be slid on their shaft to engage clutch elements 34 which they carry with coacting clutch elements 35 on the sprockets 31. As shown in Fig. 1 the drums 3 and 4 are connected with the rod 33 so that when the same is reciprocated by operation of the bell crank 36 they will be correspondingly moved. Both of the drums 3 and 4 may be disposed in neutral position as indicated in the last mentioned figure, or one may be connected with a sprocket 31 and the other disengaged from the opposite sprocket 31. In other words, either of the drums may be active and the other idle at the will of the operator.

From the foregoing description taken in connection with the accompanying drawings, it will readily be seen that either the vehicle drive means or the windlass drive means may be selectively operated from the same source of power. This is obtained by the provision of the shiftable gears 17 and means for throwing the same into and out of mesh with the gears 10. In other words these gears are meshed when the vehicle is to be driven and disengaged when the windlass drums are to be operated. It will be also noted that said drums may be actuated at different speeds and in reverse speed due to the selective speed mechanism provided by the gears 11, 12, 15 and 16 and the reverse gears 18.

I claim:

1. In a vehicle, the combination with a power unit, a driven element carried by the vehicle, of a transmission mechanism including a two-part drive shaft having vehicle driving means connected with one part, a driving gear on a part of the shaft, a driven gear on the other part of the shaft, a jack shaft, a driven gear on the jack shaft and adapted to have the drive gear of the two-part shaft meshed therewith, a clutch controlled connection between said element and the jack shaft, and the gear slidably splined to the jack shaft and adapted to be engaged with or disengaged from the driven gear of the two-part shaft whereby to selectively operate either the vehicle or the said element.

2. In a vehicle, the combination with a power unit, a driven element carried by the vehicle, transmission mechanism including a differential, a two-part differential shaft extending from each side of the differential and having vehicle driving means connected with each outer section, a driven gear on each outer section of said two-part differential shafts, a pair of shiftable gears of different sizes slidably disposed on each inner section of each differential shaft, a jack shaft formed of two sections, a clutch controlled connection between each section of said jack shaft and the said element, selective speed gears fixed to each section of said jack shaft and adapted to have said shiftable gears of the differential shafts selectively connected therewith, a driving gear slidably splined on each section of the jack shaft and adapted to engage said gears on the outer sections of the differential shafts, and driving means connected with said differential.

In testimony that I claim the foregoing I have hereunto set my hand at Milwaukee, in the county of Milwaukee and State of Wisconsin.

FLOYD CORNELISON.